June 16, 1959  R. C. ALBRECHT  2,890,585
HARDNESS TESTER

Filed May 2, 1956  5 Sheets-Sheet 1

FIG.1.

INVENTOR
RANSOM C. ALBRECHT

BY
Cushman Darby & Cushman
ATTORNEY

FIG. 5.

United States Patent Office 2,890,585
Patented June 16, 1959

2,890,585

HARDNESS TESTER

Ransom C. Albrecht, Baltimore, Md., assignor to Crown Cork & Seal Company, Inc., Baltimore, Md., a corporation of New York Application May 2, 1956, Serial No. 582,144

17 Claims. (Cl. 73—81)

The present invention relates to a machine for testing the hardness of materials and, more particularly, to a machine for testing the hardness of a coating made of an electrically nonconducting material.

In prior apparatus for testing the hardness of materials, a certain amount of the testing depended on the skill of the operator in his ability to perform the test, including his familiarity with the machine on which he was conducting the test. The tests required skilled operators to evaluate the operation of the testing machine in that the operators had to determine from the tests what the hardness of the material was by use of theory combined with the mechanical operations of the machine. In other words, two operators performing the same test on the same material would possibly obtain different results because of the personal factors involved in operation of the hardness testing machine.

An object of the present invention is to provide a hardness testing machine in which the personal factor of operation in determining hardness of the material is eliminated and the operator's efforts are pure mechanics. By having the operator's efforts pure mechanics, the results obtained from the testing machine are constant, regardless of who is operating the machine.

Another object of the present invention is to provide a hardness testing machine which can accurately determine the hardness of a material having a nonplanar surface.

Still another object of the present invention is to provide a hardness testing machine which can apply a continuously increasing load to a material having a nonplanar surface, the load being applied to a new surface of the material as it is increased.

A further object of the present invention is to provide a hardness testing machine capable of applying a constant load on a material having a nonplanar surface, the load being applied at different points on the surface of the material.

A still further object of the present invention is to provide a hardness testing machine capable of applying a continuously increasing load to a material, the load application being automatically stopped when the maximum hardness of the material has been reached.

Still another object of the present invention is to provide a hardness testing machine which will quickly and automatically obtain a hardness of the material being tested, the operator merely having to place the material in position on the machine and start the machine.

A further object of the present invention is to provide a hardness testing machine capable of testing the hardness of an electrically nonconducting coating on an electrical conducting material.

A still further object of the present invention is to provide a hardness testing machine for testing a coating on an electrical conducting material, the breakthrough of the coating being an entirely mechanical operation and not aided by arcing or low dielectric properties of the coating being tested.

Still another object of the present invention is to provide a hardness testing machine with a penetrator element having a ball-type stylus, the penetrator element being moved with respect to a material having a nonplanar surface as load applied by the penetrator element is continuously increased.

These and other objects of the present invention will appear more fully in the following specification, claims, and drawings in which:

Figure 1:
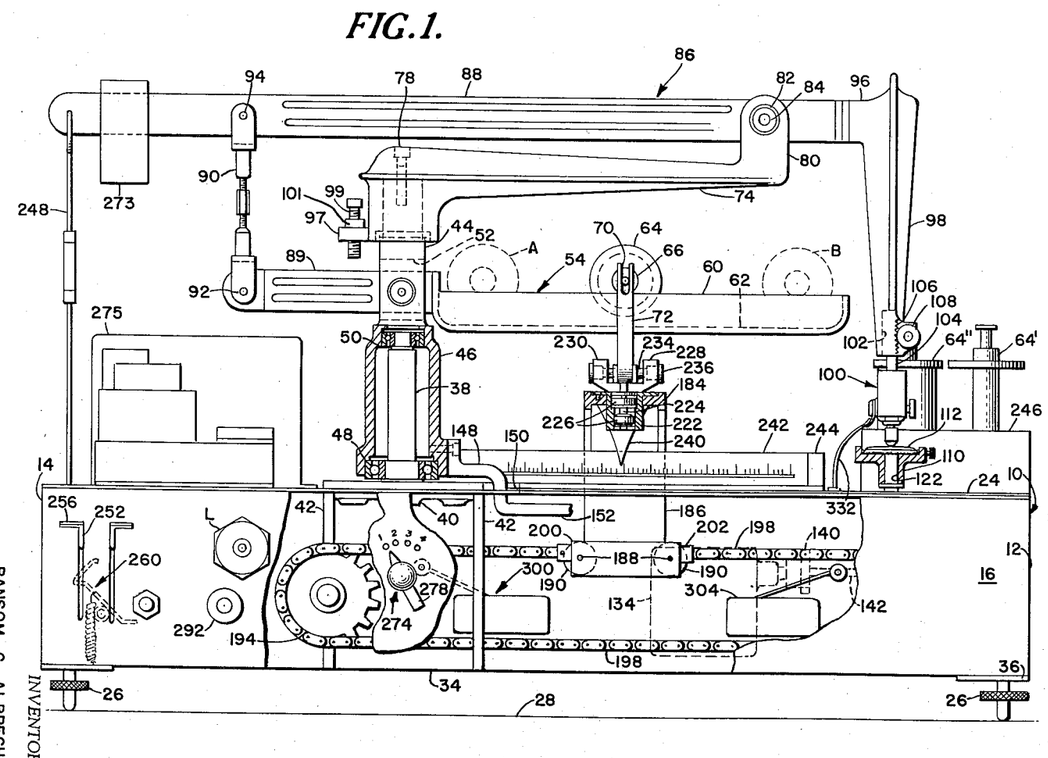
Figure 1 is a front elevational view partly in cross-section of the hardness testing machine of the present invention.
Figures 3, 6:
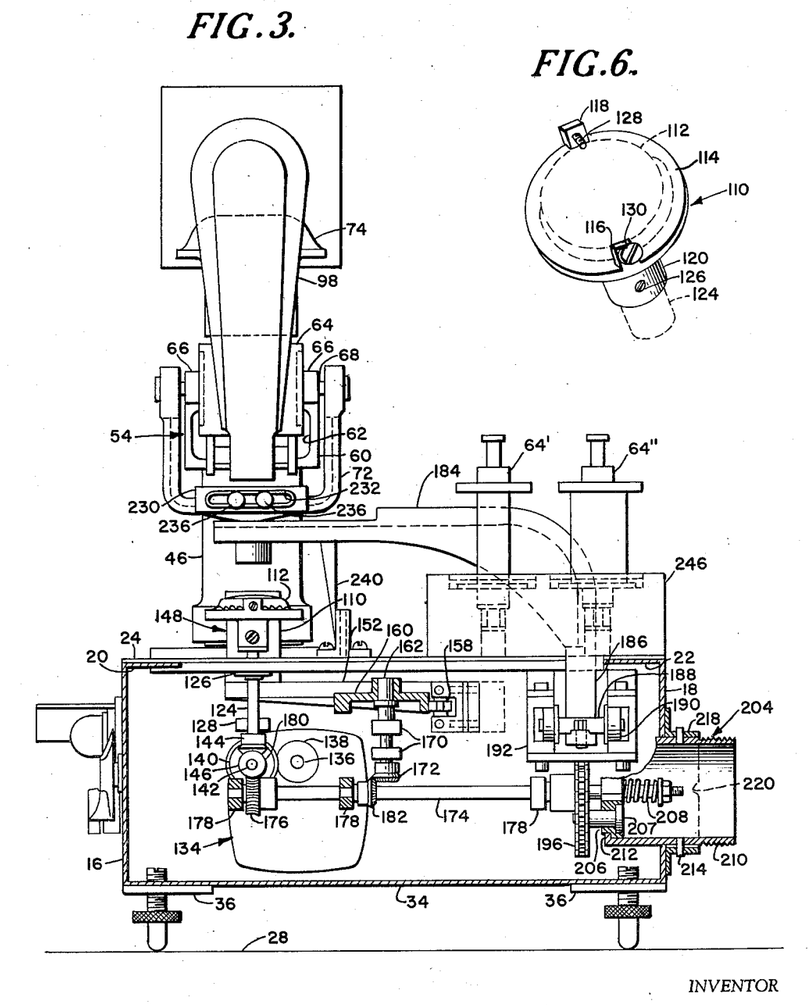
Figure 3 is an enlarged side elevational view of the hardness testing machine looking from the right of Figure 1, parts of the machine being broken away and shown in cross-section for purposes of clarity.
Figure 6 is an enlarged perspective view of the specimen-carrying platform of the hardness testing machine.
Figures 4, 7:
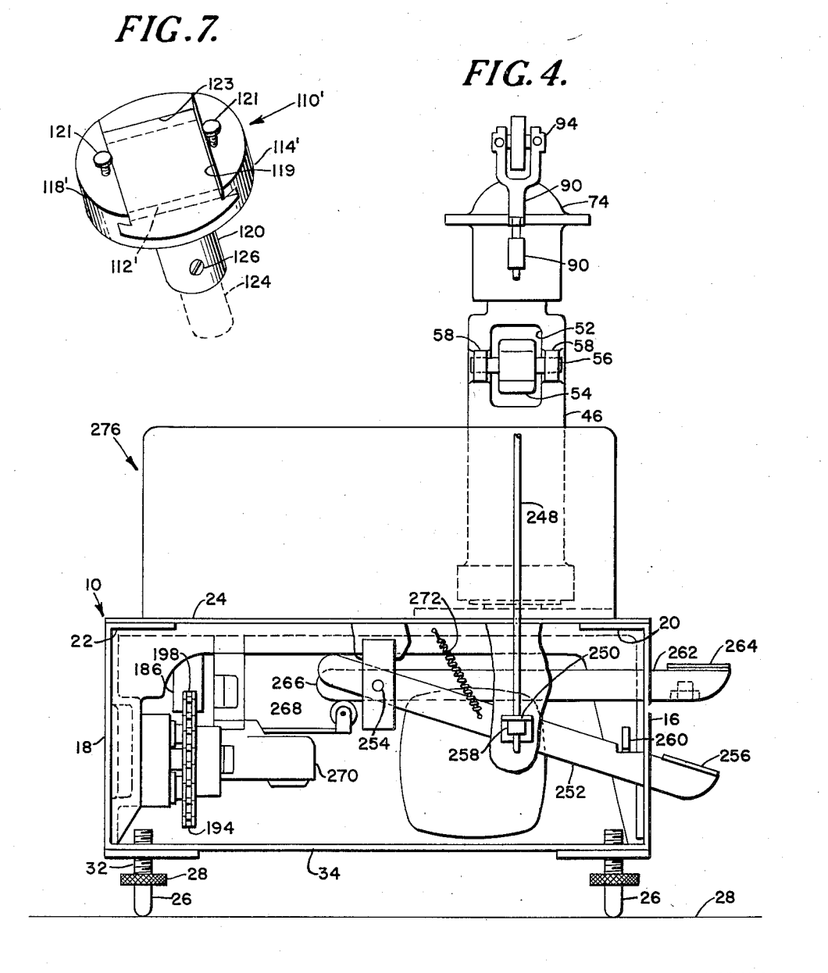
Figure 4 is an enlarged side elevational view of the hardness testing machine looking from the left of Figure 1, parts of the machine being broken away and shown in section for purposes of clarity.
Figure 7 is a view similar to Figure 6 but showing a modified form of platform for holding the specimen to be tested.

Referring now to Figure 1, wherein like character or reference numerals represent like or similar parts, the hardness testing machine of the present invention is provided with a box-shaped frame structure 10 having end walls 12 and 14 respectively and side walls 16 and 18. The side walls 16 and 18 respectively are provided with inturned flanges 20 and 22 respectively on their upper ends, as shown in Figures 3 and 4, the flanges 20 and 22 providing a surface to detachably support a top wall or plate 24. Suitable braces and brackets (not shown) are provided within the box-shaped frame structure 10 to give it added rigidity.

A plurality of legs 26 are provided for supporting the frame structure 10 on a table top or the like 28. Legs 26 are integrally provided with a knurled knob or nut 30 and a threaded portion 32, the threaded portion being received in suitable threaded apertures (not shown) provided in a bottom plate 34 of the frame structure. Suitable reinforcing plates 36 may be provided on the bottom plate 34, the reinforcing plates being threaded to receive the legs 26. Legs 26 may be individually adjusted so as to level the hardness testing machine prior to the running of a test on a specimen. A bubble type level 27 is suitably mounted on the upper plate 24 to assist the operator in leveling the machine.

Extending upwardly from the upper surface 24 of frame structure 10 is a vertical shaft 38. Shaft 38 is supported on a suitable reinforcement plate 40 carried between reinforcement partitions 42 mounted in frame structure 10. A vertical shaft 44 having a tubular lower end 46 is adapted to fit over the support shaft 38 and be rotated thereon. Suitable bearings 48 and 50 are provided on the upper and lower ends respectively of shaft 38 to support the vertical shaft 44 so that it may be rotated about a vertical axis. A slot 52 extending transversely through the upper portion of shaft 44 is adapted to receive one end of a loading beam 54. As clearly shown in Figures 1 and 4, loading beam 54 extends through the slot 52 in shaft 44 and is pivotally mounted to the shaft by means of a horizontal pivot pin 56 supported in bearings 58 carried by the shaft.

One arm 60 of loading beam 54 is dish-shaped, as indicated at 62, and is adapted to receive a roller or weight element 64. Weight element 64 is provided with an axle or hub 66 extending axially from each of its ends, the axle or hub 66 being adapted to bear against the upper edge of the dish-shaped arm 60 of loading beam 54 to thereby support the weight element 64 within the dish-shaped portion 62. Each of the axles 66 is provided with a reduced portion 68 (Fig. 3) which is adapted to ride in slots 70 of a yoke member 72. The purpose of yoke member 72 will be described in more detail later in the specification.

Mounted on the upper end of shaft 44 is an arm 74 extending radially from the shaft above the weight carrying arm 60 of loading beam 54. Arm 74 is fixed to the shaft by means of studs 78 extending through the arm and into the end of the shaft. As is now evident, arm 74, which is fixedly attached to shaft 44 and loading beam 54, will rotate or pivot with shaft 44, on a vertical axis.

The outer end of arm 74 is provided with an upwardly extending bifurcated fitting 80. Fitting 80 is provided with bearings 82 which are adapted to receive and pivotally support a horizontal pivot shaft 84. Horizontal shaft 84 extends through a lever arm 86 and provides means for pivoting the lever arm on a horizontal axis. A portion 88 of lever arm 86 extends rearwardly from its pivot 84 in longitudinal alignment with the loading beam 54 and is connected to the end 89 of the loading beam 54 which extends through slot 52 in vertical shaft 44 by means of a connecting link or rod 90. Connecting link 90, which is pivotally connected to the loading beam 54 and the lever arm 86 at 92 and 94 respectively is of the turnbuckle type so that the distance between the loading beam and lever arm can be accurately adjusted.

A lug 97 extending outwardly from arm 74 is provided with a set screw 99 which may be adjusted vertically thereof. A jam nut 101 provided on the set screw 99 locks the set screw in a fixed vertical position. Set screw 99 provides a stop to limit pivotal movement of loading beam 54 when weight element 64 moves from position A to position B.

The end 96 of lever arm 86 which extends forwardly of its pivot 84 is provided with a downwardly extending arm 98. Arm 98 terminates short of the upper plate 24 of frame structure 10 and is adapted to support a penetrator element generally indicated at 100. In more detail, the lower end of arm 98 is provided with an axial extending bore 102 which is adapted to receive a shaft 104 extending upwardly from the penetrator element 100. Shaft 104 is provided with a rack 106 which is engaged by a worm 108 supported on the lower end of arm 98. By rotation of the worm 108, the vertical position of the penetrator element 100 can be manually adjusted with respect to the specimen being tested.

Positioned below the penetrator element 100 is a platform 110 which is adapted to support a specimen 112. Platform 110, as best shown in Figure 6, includes a flat disk portion 114 which has two diametrically opposed lugs 116 and 118 extending upwardly from its periphery. A boss 120 extends downwardly from the lower surface of disk 114 and is provided with an axially extending bore 122 for receiving the upper end of a drive shaft 124. A set screw is provided in boss 120 for locking the penetrator element 100 on the rotatable drive shaft 124. A short pin element 128 extends inwardly from the lug 118 while the other lug 116 is provided with a set screw 130 having a knurled knob 132. The platform 112 disclosed in Figure 6 is adapted to receive the specimen 112 which, in this particular instance, is a crown or cap for a bottle having a non-planar or convex upper surface. One portion of the skirt of the cap 112 is adapted to fit under the pin 128 with the pin extending between the flutes, and the set screw 130 is adapted to be threaded in and engage the skirt at a position oppositely disposed from the pin 128 and, thus, retain the cap 112 in position for a hardness test on its coating.

Referring now to Figure 7, a modified form of platform 110' is disclosed. The platform 110' is adapted to receive rectangular flat specimens 112'. Platform 110' includes a flat disk 114', the disk being provided with oppositely disposed shoulders 116' and 118', which extend across a chord of the disk and define a slot therein. Shoulders 116' and 118' are each provided with an inwardly extending flange portion 119 and a specimen is adapted to be slipped under the flanges of the shoulders and held in place by set screws 121 which bear downwardly against the upper surface of the specimen. A stop member 123 is provided adjacent one end of the slot formed by the shoulders 116' and 118' to assist in retaining the specimen 112' in position.

Supported within the box-like frame structure 10 is a reversible electric motor 134. The electrical circuit for the motor will be described in more detail later in the specification. Motor 134 is provided with a drive shaft 136 (Fig. 3) on which is mounted a drive gear 138. Drive gear 138 is adapted to mesh with a gear 140 keyed to a drive shaft 142 which extends longitudinally of the frame structure.

Drive shaft 124, which extends upwardly through the upper plate 24 and supports the platform 110, is suitably mounted for rotation in bearings 126 and 128 carried in the frame structure 10. The lower end of drive shaft 124 is provided with a bevel gear 144 which is adapted to mesh with a beveled gear 146 carried by drive shaft 142. As is now evident, motor unit 134 will cause platform 110 to rotate in either direction on a vertical axis, depending on whether the motor is operating in forward or reverse.

Figure 2:
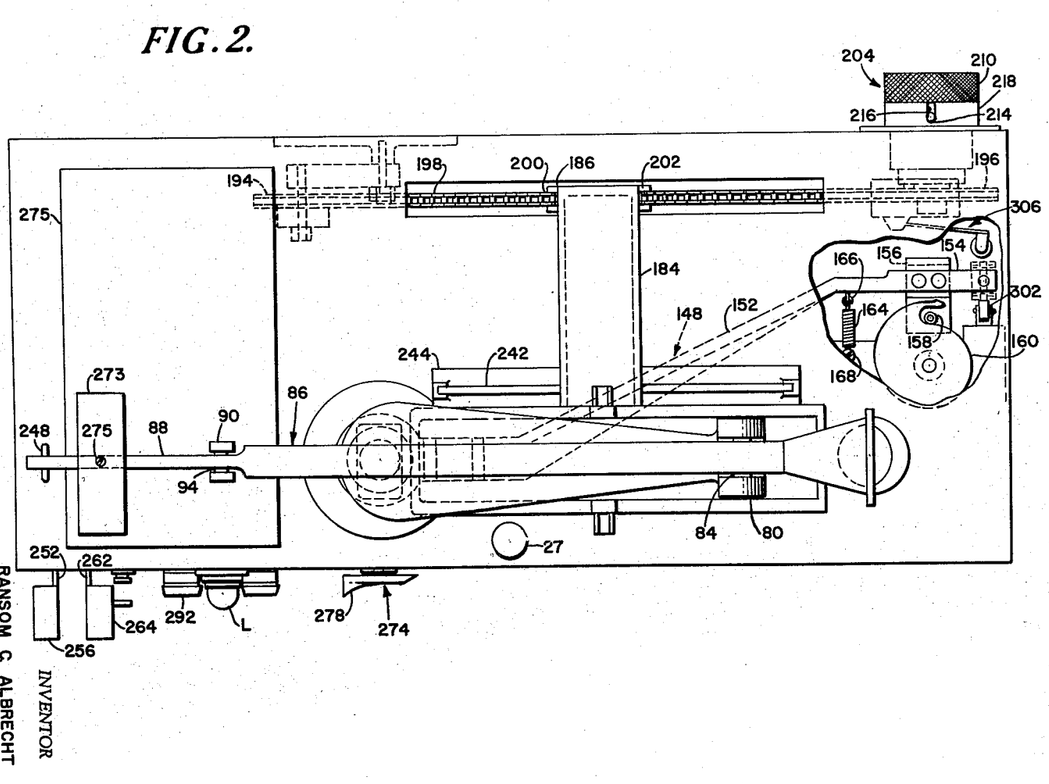
Figure 2 is a top plan view of the hardness testing machine disclosed in Figure 1, parts being broken away for purposes of clarity.

As clearly shown in Figures 1 and 2, an arm 148 is attached to the lower end of vertical shaft 44 and extends outwardly downwardly through a suitable aperture 150 in the upper surface 24 of frame structure 10. The arm 148 then extends outwardly from and at an angle to a radius of vertical shaft 44, as indicated at 152, and terminates at 154. A bracket member 156 is detachably connected to the outer end 154 of arm 148 and includes an upwardly extending roller or cam follower 158. A cam 160 mounted on a vertical shaft 162 is adapted to engage the cam follower or roller 158 and move the arm 148 in a counterclockwise direction, as viewed in Figure 2. A spring 164 connected to arm 148 at 166 and to the frame structure 10 at 168 normally urges the arm 148 in a clockwise direction or in a direction where its cam follower 158 constantly engages the cam surface of cam 160, so as to follow the same. Drive shaft 162, on which cam 160 is keyed, is mounted in suitable bearings 170 supported in frame structure 10 and is provided at its lower end with a beveled gear 172.

A drive shaft 174 supported in bearings 178 is provided with a pinion 176 which meshes with a worm 180 carried on the outer end of drive shaft 142. A beveled gear 182 keyed to shaft 174 is adapted to mesh with beveled gear 172 and, thus, rotate the cam 160 in a counterclockwise direction, as viewed in Figure 2, when the motor unit 134 is operating in a forward direction. It is now evident that operation of the motor unit 134 will, simultaneously with the rotation of platform 110, also cause the pivoting of arm 148 on a vertical axis. Since arm 148 is fixedly connected to the vertical shaft 44, the loading beam 54, arm 74, and lever arm 86 are all pivoted about the vertical axis of shaft 44 when the shaft is pivoted by the arm 148.

When arm 86 is pivoted, it carries with it the penetrator element 100 and moves the penetrator element in an arcuate path on a substantially horizontal plane. Since the penetrator arm is moving transversely across the surface of the specimen 112 being tested and the specimen is simultaneously rotating, the path of travel of the penetrator element with respect to the specimen will be phonographic or spiral.

The above description has been referred to with the motor operating in a forward direction and in this direction the penetrator arm would be moving counterclockwise, as viewed in Figure 2, while the supporting platform is rotating. On the other hand, if the motor unit 134 is reversed, it is now obvious that the penetrator arm will move clockwise as it follows the cam to the position shown in Figure 2.

As has been previously mentioned, roller or weight element 64 is adapted to move longitudinally on the loading beam 54. Although the weight element 64 is actually supported on the beam 54, it is moved longitudinally thereon by the yoke 72 which engages the ends 68 of its axles 66. It will be noted that the slots 70 in the yoke 72 are of sufficient depth that the full weight of the roller weight 64 is carried by the loading beam 54.

Yoke 72 is universally supported on an arm 184 which is carried by a carriage member 186. In more detail, carriage member 186 is provided with a pair of axles 188 having wheels 190 on their ends. The wheels 190 are adapted to ride in a horizontally extending trackway 192 carried within the frame structure 10. A pair of aligned pulleys or sprockets 194 and 196, each mounted for rotation on a horizontal axis, are provided with a chain drive 198, the chain drive passing around the pulleys, as shown in Figure 1, and being conected to the carriage at 200 and 202. Pulley or sprocket 196 is mounted on drive shaft 174 for free rotation with respect thereto. However, a clutch element generally indicated at 204 including a disk 206 with pins 207 thereon is keyed to shaft 174 and is adapted to be urged toward the pulley or sprocket 196 so that the pins engage apertures therein to provide a driving connection for the sprocket. The clutch 204 is provided with a clutch operator 210 which is merely a tubular sleeve having a flanged end 212 which is adapted to engage the disk 206. The clutch operator 210 is provided with radially extending pins 214 which are received in slots 216 provided in a collar 218 mounted on the rear side 18 of frame structure 10. When the pins 214 are in the slots 216, the clutch 204 is in driving engagement and the sprocket 196 is driven by the rotation of drive shaft 174. This will cause the carriage member 186 to move longitudinally of the frame structure 10 and carry with it the yoke 72 so as to move weight element 64 along the loading beam 54. Movement of the weight 64 will change the load being applied by the penetrator element 100 due to the mechanical advantage created by the lever arrangement of the loading beam 54 and lever arm 86.

When it is desired to apply a fixed or constant load by the penetrator element 100, then it is merely necessary to disengage clutch 204 so that the sprocket 196 is not driven. To disengage the clutch 204, the clutch operating member 210 is pulled axially outwardly until the pins 214 are free of the slots 216. The clutch operating member 210 is then rotated 90° so that the pins 214 will then come into alignment and engagement with slots 220 which are not as deep as the slots 216 and, thus, the pins 207 are maintained out of engagement with the sprocket 196.

Referring now to Figures 1 and 3, the yoke 72, as previously mentioned, is universally supported on the arm 184. Arm 184, which is movable longitudinally of frame structure 10, is provided with a tubular sleeve 222. A shaft 224 is vertically supported for rotation within the tubular sleeve 222 by means of bearing assemblies 226. The upper end of shaft 224 extends above the arm 184 and supports a bracket member 228 for rotation therewith. Bracket member 228 is provided with spaced upstanding flanges 230 and each of the flanges is provided with an elongated slot 232. Yoke 72 is provided at its lower end with a pair of axles 234 having rollers 236 on its outer ends. The rollers are adapted to ride in the trackway provided by the slots 232.

When loading beam 54 is pivoted on its vertical axis by the vertical shaft or post 44, it will move the yoke member 72 and the bracket 228. Since the yoke member 72 will follow an arcuate path when it moves with the loading beam 54, the bracket 228 pivots on a vertical axis so that in effect while the yoke member is moved in its arcuate path, it also is able to pivot on a vertical axis to give it a universal movement with respect to the longitudinal movement of arm 184.

A pointer element 240 carried by the arm 184 extends downwardly from the arm to a position above the upper plate 24 of frame structure 10. A scale 242 suitably supported in bracket 244 mounted on the upper plate 24 of frame structure 10 is provided with suitable indicia so that a direct reading of the load being applied by penetrator element 100 may be obtained. The bracket 244 is provided with a suitable slot so that the scale 242 may be removably replaced depending upon the size of weight element 64 being carried by loading beam 54.

The upper plate 24 of frame structure 10 may be provided with a box structure 246 at one end thereof for carrying spare weights 64' and 64". Separate scales 242 may also be suitably carried on the frame structure 10 so that they can be substituted when different weights are used.

A connecting rod 248 is connected to the end portion 88 of lever arm 86 and depends downwardly therefrom. The lower end of connecting rod 248 extends through a suitable aperture provided in an L-shaped bracket 250 mounted on a pivot arm 252. The arm 252 is pivoted to the frame structure at 254 and is provided with a handle portion 256 extending out of the box-shaped frame structure 10. The lower end of rod 248 is provided with a suitable stop member 258 which bears against the undersurface of the bracket 250 when the lever arm 252 is being moved to the position shown in Figure 4. When in the position shown in Figure 4, the lever arm 252 will have caused the arm 86 to pivot about its pivot 84 so as to lift the penetrator element 100 free of the specimen 112. A suitable latch mechanism 260 is adapted to snap over the lever arm 252 when it is in the down position and hold the lever arm downwardly so that the penetrator element 100 is maintained elevated from the specimen 112. When the lever arm 252 is in the upper position, as shown in Figure 1, the bracket 250 is free of the stop 258 on connecting rod 248 and, consequently, the lever arm 86 is free to pivot about its pivot 84, as load is applied on the loading beam 54.

Positioned adjacent the lever arm 252 is a second lever arm 262 shown in the upward position in both Figures 1 and 4. Arm 262 is pivoted on the same pivot 254 as arm 252 and is also provided with an operating handle 264. The inner end 266 of lever arm 262 is adapted to engage a switch operator 268 for a switch 270. Switch 270 is in the motor circuit for motor 134 and operates to reverse the motor. When the lever arm 262 is in the upper position, the switch operates the motor in a forward direction and the load being applied to the penetrator element 100 is continuously increased. In other words, the carriage 186 is moving the weight element 64 to the right of Figure 1, and the lever arm 86 is being pivoted in a counterclockwise direction, as viewed in Figure 2. When lever arm 262 is in its downward position, the motor is reversed and the carriage 186 is being returned to the left of Figure 1 while the arm 86 is being pivoted clockwise, as viewed in Figure 2. It will be noted that the latch mechanism 260 is released from holding the lever arm 252 in the downward position when the lever arm 262 is lowered. When it is desired to start a test over and reapply the increasing load to the same or another specimen, the lever arm 252 is positioned downward and latched into position so as to raise the penetrator element 100 off the surface of the specimen 112. However, when the motor 134 is reversed to return the weight element 64 to the left of Figure 1 and reposition the penetrator element 100 with respect to the specimen 112, the lever 262 is pressed downwardly to actuate the switch 270. It will release or trip the latch mechanism 260 so it will be necessary to hold the lever arm 252 in a downward position until such time that the weight element 64 and the penetrator element 100 are repositioned. A spring 272 connected to the frame and to the lever arm 252 returns the lever arm 252 to its normally opened position when the latch member is released if the lever arm is not held in its downward position.

A weight element 273 is provided on portion 88 of lever arm 86 for making initial adjustment to the lever mechanism. The weight element 273, which may be moved longitudinally with respect to the arm 86, is held in a fixed position by means of a set screw 275 shown in Figure 2.

Figure 5:
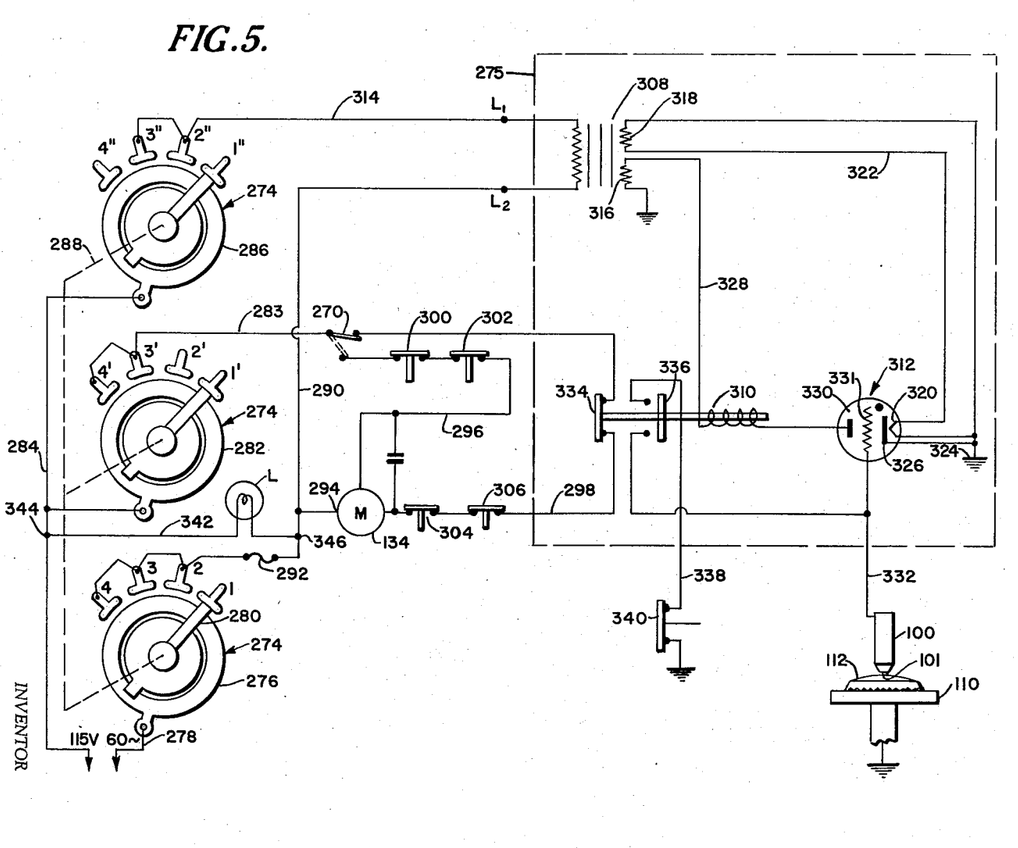
Figure 5 is a schematic wiring diagram for the hardness testing machine of the present invention.

The wiring diagram for the hardness tester of the present invention is disclosed in Figure 5. A multi-tap selector switch 274 is provided for controlling the circuit to the motor and to a current sensitive relay unit generally designated at 275 which controls the determination of hardness of an electrically nonconducting material such as a coating on a bottle cap. The multi-tap selector switch 274 is of the type having a plurality of current conducting wafers, each of the wafers being associated with a plurality of taps or contacts. More specifically, switch 274 is provided with a first wafer 276 which is connected to ground by a current conducting line 278. Wafer 276 has the taps 1, 2, 3 and 4, respectively, associated therewith and adapted to be engaged by a movable selector arm 280. A second wafer 282 is associated with taps 1', 2', 3' and 4', and is connected to a current conducting line 284. Conductors 278 and 284 lead to a 115 volt, 60 cycle source of electric power. A third wafer 286 is also connected to current conducting line 284 and is associated with the taps 1", 2", 3" and 4". The dotted line 288 indicates that the movable selector arm 280 operates simultaneously to engage one of the taps of each wafers 276, 282 and 286, respectively.

A current conducting line 290 is connected to the taps 2, 3, and 4 of wafer 276. The current conducting line 290 is provided with a fuse 292 and is connected to one terminal of motor 134, as indicated at 294. Since the motor 134 is of the type which can be reversed, one circuit of the motor 134 will be through the current conducting line 296 to the motor circuit switch 270 while the other circuit of the motor will be through the current conducting line 298 to the selector switch 270. Selector switch 270 is connected to the terminals 3' and 4' of the wafer 282 by a current conducting line 283. Current conducting line 296 of the motor circuit is provided with limit switches 300 and 302 connected in series. Limit switch 300 limits the reverse travel of carriage 186, whereas limit switch 302 will limit the movement of the arm 148 in Figure 2 in a clockwise direction. Current conducting line 298 is provided with limit switches 304 and 306 connected in series. Limit switch 304 limits the forward travel of the carriage 186 to the right of Figure 1, while the limit switch 306 limits the movement of arm 148 in a counterclockwise direction, as viewed in Figure 2.

The current sensitive relay unit 275 which may be located on the upper surface of frame structure 10 includes a transformer 308, a relay 310, and a microampere operable thyratron tube 312. The primary coil of the transformer 308 is connected to the current conducting line 290, as indicated at L₂ and to a current conducting line 314, as indicated at L₁. Current conducting line 314 leads to the taps 2" and 3" associated with the wafer 286.

Transformer 308 is preferably provided with two secondary coils, indicated at 316 and 318. The coil 318 is connected to a heater element 320 by means of a current conducting line 322. Heater element 320 is also connected to ground as indicated at 324. Cathode 326 of thyratron tube 312 may also be connected to ground at 324.

The coil of relay 310 is connected in series in a current conducting line 328 which leads from the secondary coil 316 to the plate 330 of thyratron tube 312. The grid control 331 of thyratron tube 312 is connected to the penetrator element 100 by means of a current conducting line 332. Penetrator element 100, which is provided with a ball type stylus 101 so that it may apply a direct load to a curved or nonplanar surface, will be grounded when it penetrates the electrically non-conducting coating provided on the specimen 112, at which time it will fire the thyratron tube to energize the relay 310. Relay 310 is a double pole type of relay and is provided with a normally closed contact 334 in the current conducting line 298 of the motor circuit and a normally open contact 336 in a holding circuit 338 for the relay. The holding circuit 338 maintains the relay 310 energized after firing of the thyratron tube 312 until such time that a reset switch 340 connected in series in holding circuit 338 is opened.

The operation of the hardness tester may be briefly described as follows: With the weight element 64 moved to position A of Figure 1, a test for hardness of specimen 112 may begin. Lever arm 262 is moved to the upward position so that switch 270 will assume the solid line position shown in Figure 5. The manual lift mechanism for the penetrator element 100 will be inoperative when the lever arm 252 is in the raised position. The selector switch 274 is then moved from taps 1, 1' and 1" to taps 2, 2' and 2". When in this position, the current will flow through the primary coil of the transformer and will cause the heater element 320 of thyratron tube 312 to heat. After the tube is properly heated, the selector arm 280 can be moved to contact taps 3, 3' and 3". The transformer 308 is still energized and inducing current to its secondary coils, but, in addition, the motor circuit for motor 134 will be energized through the current conductor 298. This will cause the motor to rotate its drive shaft 136 and in turn drive the carriage 186 from the left toward the right of Figure 1. The weight element 64 will move outwardly on the loading beam 54 and will continuously increase the load being applied by penetrator element 100 to the specimen 112. The arm 148 will pivot counterclockwise as viewed in Figure 2 simultaneously with the movement of the weight element 64 outwardly on the loading beam 54. Since the platform 110 is also rotating, the path covered by the penetrator element 100 across the surface of the specimen 112 is phonographic or spiral as the load being applied is continuously being increased.

If the carriage 186 or the arm 148 reach the limits of their travel prior to a break-through on the coating of the specimen 112, one or the other of the limit switches 304 and 306 will be opened, causing the circuit to the motor 134 to be broken, thus, stopping the motor. On the other hand, if the penetrator element 100 fractures the coating of the specimen 112, it will ground the grid control circuit 332, causing the grid control 331 to fire the tube 312. Firing of the tube 312 will energize the relay 310 causing the switch of contact 334 to open in motor circuit 298 and simultaneously close the holding circuit 338. Opening of the switch 334 stops the motor and the pointer element 240 will indicate the hardness at which the coating on the specimen 112 failed. By using a thyratron tube which requires only a current of micro-amperes to fire the tube, the break-through of the penetrator element must actually be grounded before the tube can fire. By using a tube requiring only a small current to fire the same, a coating having a low dielectric will not cause premature firing of the tube, resulting in false hardness values. Further, use of such a tube eliminates arcing prior to break-through of the penetrator element and, thus, an accurate result is obtained.

If it is desired to check the hardness value determined by a previous break-through, the clutch 204 is actuated to disconnect the drive to the carriage 184 so that the weight element 64 remains at the position it had on the loading beam 54 when the break-through occurred. The selector arm 280 of selector switch 274 is moved to a position where it contacts the taps 4, 4' and 4". When in this position, the motor circuit can be energized but the thyratron tube 312 cannot be fired. The motor 134 is operated a sufficient length of time to allow the penetrator element 100 to move to a different position on the surface of the specimen 112. Then the selector arm 274 is moved back to the position where it contacts the taps 3, 3' and 3". If a proper value for hardness of the specimen has been determined by the previous test, the application of the same load causes another break-through on the coating and the thyratron tube 312 will again fire, causing the motor circuit to be de-energized. On the other hand, if the coating was defective where the initial break-through occurred, and a premature hardness value was obtained, the penetrator element 100 will not break through the coating and the motor will continue to run. The clutch 204 is then thrown into engagement so that the load applied by the penetrator element can be increased until there is another break-through of the coating.

When the operator wants to reset the hardness testing machine for a new test, lever 252 is pressed downwardly to raise the penetrator element 100 off of the surface of the specimen 112. Switch 270 in the motor circuit is thrown to the dotted line position of Figure 5 so that the motor 134 is reversed. The arm 148 will pivot clockwise, as viewed in Figure 2 and the carriage 184 will move to the left of Figure 1. The limit switch 300 is tripped to its open position by the movement of the carriage as it reaches the end of its travel toward the left of Figure 1, whereas the limit switch 302 is tripped to its open position by the movement of the arm 148. Opening of either of the limit switches 300 or 302 stops the motor 134 because they are in series in the reverse circuit 296 of the motor. If levers 252 and 262 are now raised to their upper position, the machine will start a new test cycle upon momentary depressing reset switch 340 which de-energizes relay 310, thereby closing contact 334 in motor circuit 298 and opening contact 336 in holding circuit 338.

A current conducting line 342 connected to the line 284 at 344 and to the line 290 at 346 is provided with a light bulb L. The light bulb is suitably positioned on the hardness testing machine so that the operator may know when the motor circuit or tube circuit is energized.

The terminology used in the specification is for the purpose of description and not limitation, the scope of the invention being defined in the claims.

I claim:

1. In a hardness testing machine, a frame structure, a platform carried by said frame structure for supporting a specimen to be tested, a penetrator carried by said frame structure above said platform for engaging and applying a load to the specimen, means for continuously increasing the load applied by said penetrator, means operating simultaneously with said last mentioned means for moving said penetrator and the specimen relative to each other in a phonographic path whereby said penetrator acts on a new surface of the specimen as the load is continuously increased, said last mentioned means for moving said penetrator and the specimen relative to each other including a lever arm pivoted on a vertical axis and carrying said penetrator and means to simultaneously rotate said platform carrying the specimen, and means to stop said load applying means and said penetrator moving means when the hardness of the specimen being tested has been determined.

2. A hardness testing machine of the character described in claim 1 including means to apply the load determined by said last mentioned means to a new surface of the specimen being tested for checking the hardness of the specimen.

3. In a hardness testing machine, a frame structure, a platform carried by said frame structure for supporting a specimen to be tested, a vertical post extending upwardly from and rotatable with respect to said frame structure, a loading beam, said loading beam being pivotally connected intermediate its ends to said post on a horizontal pivot, a lever arm, said lever arm being pivotally connected intermediate its ends to said post on a horizontal pivot, a penetrator element carried by said lever arm above said platform for engagement with and application of a load to the specimen, means interconnecting said lever arm with said loading beam whereby a load applied to said loading beam is transferred to said penetrator element through said lever arm, a movable weight element carried on said loading beam for applying the load thereto, means to move said weight element on said loading beam to increase the load applied by said penetrator element to the specimen, and means operatively connected to said post for rotating the same on a vertical axis and thereby moving said penetrator element in a substantially horizontal plane across the specimen whereby different surfaces of the specimen can be tested under different applied loads.

4. In a hardness testing machine, a frame structure, a platform carried by said frame structure for supporting a specimen to be tested, a rotatable vertical post extending upwardly from said frame structure, a loading beam, said loading beam being pivotally connected intermediate its ends to said post on a horizontal pivot, a lever arm, said lever arm being pivotally connected intermediate its ends to said post on a horizontal pivot, a penetrator element carried by said lever arm above said platform for engagement with and application of a load to the specimen, means interconnecting said lever arm with said loading beam whereby a load applied to said loading beam is transferred to said penetrator element through said lever arm, a movable weight element carried on said loading beam for applying the load thereto, means to move said weight element on said loading beam to increase the load applied by said penetrator element to the specimen, and means to move the penetrator element with respect to the specimen whereby different surfaces of the specimen can be tested under different applied loads, said means to move said penetrator element with respect to the specimen being tested includes means to rotate the platform supporting said specimen and means to simultaneously pivot said post on a vertical axis.

5. In a hardness testing machine, a frame structure, a platform carried by said frame structure for supporting a specimen to be tested, a vertical post extending upwardly from said frame structure, a loading beam, said loading beam being pivotally connected intermediate its ends to said post on a horizontal pivot, a lever arm, said lever arm being pivotally connected intermediate its ends to said post on a horizontal pivot, a penetrator element carried by said lever arm above said platform for engagement with and application of a load to the specimen, mean interconnecting said lever arm with said loading beam whereby a load applied to said loading beam is transferred to said penetrator element through said lever arm, a movable weight element carried on said loading beam for applying the load thereto, means to move said weight element on said loading beam to increase the load applied by said penetrator element to the specimen, and means to move the penetrator element with respect to the specimen whereby different surfaces of the specimen can be tested under different applied loads, said means to move said weight element on said loading beam operating simultaneously with said means to move said penetrator element with respect to the specimen, and means to stop operation of said weight element moving means and said penetrator element moving means when hardness of the specimen being tested has been determined.

6. A hardness testing machine of the character described in claim 5 including means to move the penetrator element to a new surface on the specimen after hardness has been determined and to apply the penetrator element to the surface with the load previously determined.

7. In a hardness testing machine, a frame structure, an electrical motor unit carried by said frame structure, a platform carried by said frame structure and supporting a specimen to be tested, a vertical post extending upwardly from and rotatably mounted in said frame structure, said post including an arm extending outwardly therefrom, cam means cooperating with said arm, drive means operatively connecting said cam means to said motor unit, a loading beam, said loading beam being pivotally connected intermediate its ends to said post on a horizontal pivot, a lever arm, said lever arm being pivotally connected intermediate its ends to said post on a horizontal pivot, a penetrator element carried by said lever arm above said platform for engagement with and application of a load to the specimen, means interconnecting said lever arm with said loading beam whereby a load applied to said loading beam is transferred to said penetrator element through said lever arm, a movable weight element carried on said loading beam for applying the load thereto, a carriage member movable horizontally with respect to said loading beam and operatively connected to said weight element to move the same on said loading beam, and a chain drive operatively connecting said carriage member to said motor.

8. A hardness testing machine of the character described in claim 7 wherein said platform is rotatably mounted in said frame structure, and means operatively connecting said platform with said motor unit to rotate the same.

9. A hardness testing machine of the character described in claim 7 including means to manually raise said penetrator element with respect to the specimen.

10. A hardness testing machine of the character described in claim 7 including means to vertically adjust the penetrator element with respect to said platform.

11. In a machine for testing the hardness of an electrically nonconducting coating on an electrical conducting material, a frame structure, an electric motor unit carried by said frame structure, an electrical circuit for supplying current to said motor unit, a platform carried by said frame structure and supporting a specimen of the material, said platform being rotatably mounted in said frame structure on a vertical axis, means driven by said motor unit for rotating said platform, a penetrator element carried by said frame structure above said platform for engaging and applying a load to the specimen, means driven by said motor unit for continuously increasing the load applied by said penetrator to the specimen, means driven by said motor unit for moving said penetrator element laterally with respect to the specimen, a current sensitive relay, a normally closed contact in said motor circuit, said contact being opened by said relay, an electrical circuit for said relay, said electrical circuit including means for supplying electric current of microampere value to said relay, and means to operate said last mentioned means when said penetrator element fractures the coating on the specimen and engages the electrical conducting material of the specimen.

12. A machine of the character described in claim 11 wherein said means for supplying electric current of micro-ampere value to said relay is a thyratron tube connected in the electrical circuit for said relay.

13. A machine of the character described in claim 12 including a holding circuit for said relay, said holding circuit having a normally closed contact therein, said normally closed contact being opened to break the holding circuit and de-energize the relay.

14. An apparatus of the character described in claim 11 including means to operate said motor unit independently of said relay circuit.

15. A machine of the character described in claim 11 wherein said penetrator element includes a ball stylus for engaging the surface of the specimen.

16. A machine of the character described in claim 11 including manual means for raising the penetrator element out of engagement with the specimen operable independently of said motor unit.

17. In a hardness testing machine, a frame structure, an electrical motor unit carried by said frame structure, a platform carried by said frame structure and supporting a specimen to be tested, a vertical post extending upwardly from and rotatably mounted in said frame structure, a loading beam, said loading beam being pivotally connected intermediate its ends to said post on a horizontal pivot, a lever arm, said lever arm being pivotally connected intermediate its ends to said post on a horizontal pivot, a penetrator element carried by said lever arm above said platform for engagement with and application of a load to the specimen, means interconnecting said lever arm with said loading beam whereby a load applied to said loading beam is transferred to said penetrator element through said lever arm, a movable weight element carried on said loading beam for applying the load thereto, a carriage member movable horizontally with respect to said loading beam and operatively connected to said weight element to move the same on said loading beam, a chain drive operatively connecting said carriage member to said motor, and means operatively connecting said post to said motor unit for rotating said post to thereby move said penetrator element with respect to the surface of the specimen.

References Cited in the file of this patent

UNITED STATES PATENTS

| | | |
|---|---|---|
| 1,937,115 | Hayford et al. | Nov. 28, 1933 |
| 2,311,430 | Beno | Feb. 16, 1943 |
| 2,349,699 | Boor | May 23, 1944 |
| 2,373,200 | Simmon et al. | Apr. 10, 1945 |
| 2,530,257 | Marcus | Nov. 14, 1950 |
| 2,768,823 | Lindars | Oct. 30, 1956 |